United States Patent [19]
Hernandez

[11] Patent Number: 5,819,933
[45] Date of Patent: Oct. 13, 1998

[54] EQUIPMENT STORAGE CAGE

[76] Inventor: Octavio P. Hernandez, 1007 Park Hill La., Escondido, Calif. 92025

[21] Appl. No.: 835,174

[22] Filed: Apr. 7, 1997

[51] Int. Cl.$^6$ .............................. B60R 9/00; B65D 85/00
[52] U.S. Cl. ......................... 206/373; 206/349; 220/485; 224/404
[58] Field of Search .................................. 206/320, 349, 206/372, 373; 211/60.1; 220/485, 486, 491, 492, 668; 224/403, 404

[56] References Cited

U.S. PATENT DOCUMENTS

| | | | |
|---|---|---|---|
| 803,200 | 10/1905 | Stripe | 220/485 |
| 1,443,901 | 1/1923 | Murray | 220/485 |
| 3,627,163 | 12/1971 | Taylor | 220/485 |
| 3,647,077 | 3/1972 | Gillespie | 220/485 |
| 4,733,703 | 3/1988 | Cimino | 206/373 |
| 5,119,937 | 6/1992 | Reynolds, Jr. | 206/349 |
| 5,332,085 | 7/1994 | Fraser | 206/349 |
| 5,505,303 | 4/1996 | Sirman | 206/349 |
| 5,564,566 | 10/1996 | Lamb | 206/349 |
| 5,642,829 | 7/1997 | Hardison | 220/491 |

*Primary Examiner*—Jimmy G. Foster
*Attorney, Agent, or Firm*—John J. Murphey, Esq.; Murphey Law Offices

[57] ABSTRACT

An article of manufacture for storing and securing a variety of motor-driven landscape tools therein, comprising a container including a bottom floor panel and upstanding spaced-apart front and rear side wall panels and end wall panels attached about the perimeter of said bottom floor panel and attached together along their respective marginal edges, a top lid panel pivotally attached to one of the vertical wall panels arranged to close over container and form a secure enclosure having an interior chamber a first pair of arms mounted exterior said container on which to hang at least one first tool, first and second pairs of Y-supports formed on top of the end walls on which to support at least one second tool in secured confinement, a third set of stiff, spaced-apart iron bars formed in one of the end walls through which to accept the extension of a portion of a third tool generally contained within the chamber, and, a fourth set of stiff, iron spaced-apart bars mounted on said lid for interconnection with said first means for securing the lid over the container in locking engagement with said first pair of arms.

22 Claims, 7 Drawing Sheets

EQUIPMENT STORAGE CAGE

BACKGROUND OF THE INVENTION

1. Field of the Invention

This invention pertains to the field of equipment storage devices. More particularly, this invention pertains to a device in which certain landscaping equipment may be stored and secured and on which certain other equipment may be hung, all able to be securely locked against thievery yet easily and quickly releasable by swinging one element and twisting another element of the device.

2. Description of the Prior Art

More and more landowners are switching from maintaining their own landscaping to having that service performed by professional landscaping companies. To maintain decorative grasses, flowers, bushes and trees in a good presentation and in their best health, small groups of hard working individuals are forming businesses that provide special services of cleaning, feeding, cutting and otherwise maintaining the beautiful landscapes that adorn many apartment complexes, condominium units, houses, hotels, motels and the like. These landscaping companies travel from place to place, in small trucks, with a small group of persons highly skilled in landscape maintenance and adept at using a plurality of small, special maintenance equipment in performing their services.

The maintenance equipment used by these landscape professionals include long, slender wire-whipping devices generically known as weed eaters, electrically driven hedge trimmers, gasoline driven leaf blowers and gasoline driven chain saws plus an assortment of standard rakes, shovels, hoes and the like. The weed eaters, hedge trimmers, leaf blowers and chain saws are rather expensive devices that significantly reduce the time required to form their specific function over their hand-operated counterparts and thus require a certain amount of special handling and secure storage. In many landscape businesses, the entire inventory of operative equipment is transported from job site to job site in a small pickup truck carrying two men in the cab of the truck and the equipment in the bed of the truck. The truck is parked at the curb of the street running in front of the yard or other job site, and the truck bed is used to store the equipment when not in use during the landscaping operation. Because many landscaping operations of this type are two-person operations, one will normally find two of each machine or tool in the truck, namely two weed eaters, two chain saws, two hedge trimmers, and two leaf blowers. By this means, each worker has his/her own inventory of special equipment and their individual efforts are not restricted by the lack of availability of a special piece of equipment at any given time.

Two problems are encountered by landscape businesses of the type described. The first is that this special equipment must share the bed of the truck with larger equipment such as grass-cutting lawn mowers and the like. This makes for a jumbled mess of equipment and the distinct possibility that stacking one piece of equipment upon another or allowing one item to roll over or fall onto another will cause damage to one or more pieces of equipment. Especially where small, high speed gasoline engines and electric motors are concerned, any substantial tumbling or bumping seems likely to cause the engines not to start quickly or run smoothly and likewise causes motors to issue dangerous sparks or operate with loud squeaks and other noises that generally indicate servicing is necessary. The efficiency and therefore the success of a landscape business is generally based upon the efficient utilization of daylight hours on the job. Any down time caused by equipment malfunctions detracts directly from work hours and ultimately reduces the bottom line profit.

The second problem is that of theft. The open bed of a pickup truck parked at the curb next to a sidewalk and loaded with a plurality of motor-driven landscape equipment presents a ready target for the common thief. Such equipment is easily stolen from the truck and finds a ready market at swap meets and garage sales for the homeowner who plans to do his own landscape maintenance or for the juvenile who wants the gasoline engine to "soup-up" a bicycle, motor scooter, or the like.

Solving one problem seems to exacerbate the other problem. To reduce theft, one may lock up certain tools and equipment with chains and padlocks. However, with two of each weed eaters, chain saws, leaf blowers and hedge trimmers in each truck bed, sorting out the appropriate chain for each item and draping the chain and padlock over and around other tools and equipment in the bed is time-consuming and increases the chances that one or more pieces of equipment will be damaged by the chains or the padlocks or both. Attaching hangars to the truck bed on which or in which to place the equipment is a solution, however, usually there is required a specific hangars for each specific items of equipment and other tools and equipment must be moved out of the way of the hangar resulting in some portions of the truck bed becoming over-burdened with equipment and tools while other portions of the bed hold only a few pieces of equipment. In either case, tools and equipment compete for room in the truck bed while anti-theft measures and specific storage often increase this competition.

SUMMARY OF THE INVENTION

This invention is a unique article of manufacture in the form of a container or cage that is specifically designed for the professional landscaper and solves all of the problems hereinbefore described. It is small in size, however large in capacity and may be located virtually anywhere above, along or in the bed of the truck. It is specifically designed to store and secure pairs of chain saws, hedge trimmers, leaf blowers and weed eaters. One of the invention's most unique features is that any of the equipment may be placed in secured storage in the article and/or removed therefrom using a simple, three-step movement of attaching/detaching the padlock, twisting a bar and lifting the lid of the container. No chains or plurality of locks are involved and no equipment needs to be moved from one place to another to free up a chain saw, a trimmer, etc., and the stored equipment is held safe and free from damaging contact from other equipment. The cage may be mounted in, on, above or to the side of any portion of the truck bed so as to keep it away from areas of the truck congested by other tools and equipment. Finally, it is strong, capable of long-term and heavy use and is rugged enough to form the base for other equipment stored atop thereof.

The invention is an article of manufacture for storing and securing a variety of motor-driven landscape tools comprising a container including a bottom floor panel and upstanding spaced-apart front and back wall panels and end wall panels joined about the perimeter of the floor panel, the panels joined together along their respective vertical marginal edges to form a secure structure that defines an interior chamber. A top lid panel is pivotally attached to one of the side wall top edges and arranged to close over the container and chamber therein to form a secure closure. A first means is mounted exterior the container on which to hang at least one, but preferably two leaf blowers. A second means is formed along the top edges of the end wall panels on which to support at least one, but preferably two, elongated weed eaters in spaced-apart arrangement. A third means is formed in one of the end wall panels through which an extension of a portion of at least one, but preferably two, hedge trimmers may be accepted when the tools are secured in the chamber. The interior of the cage is large enough to wholly contain small and medium size chain saws. Finally, a rotating bar lock mechanism is mounted on the lid panel for interconnection with the first means and includes a fourth means for securing the lid to the top of the container and into locking engagement with the first means for overall securing with just a single common padlock.

Accordingly, the main object of this invention is an article of manufacture for free utilization or attachment to the bed of a pickup truck in which to store and secure specifically a pair of leaf blowers, a pair of weed eaters, a pair of chain saws and a pair of hedge trimmers. Other objects of the invention include a means of storing pairs of specific tools in locked arrangement for easy and quick access without having to unlock numerous locks or untangle numerous security chains; a means of placing at-ready a pair of power tools that may be stored and later removed from locked security by the quick manipulation of three elements, namely a padlock, a locking bar and the container lid; a means of storing for safe transport pairs of motor-powered tools that remain locked in secure storage until the exact moment of required use; and, a means of reducing the chance of theft of powered tools from the open bed of a pickup truck parked long a curb on a street.

These and other objects of the invention may become apparent from a close reading of the preferred embodiments along with the drawings appended hereto. The protection sought by the inventor in this patent may be gleaned from a fair reading of the claims that conclude this specification.

DESCRIPTION OF THE PREFERRED EMBODIMENT

Figure 1:
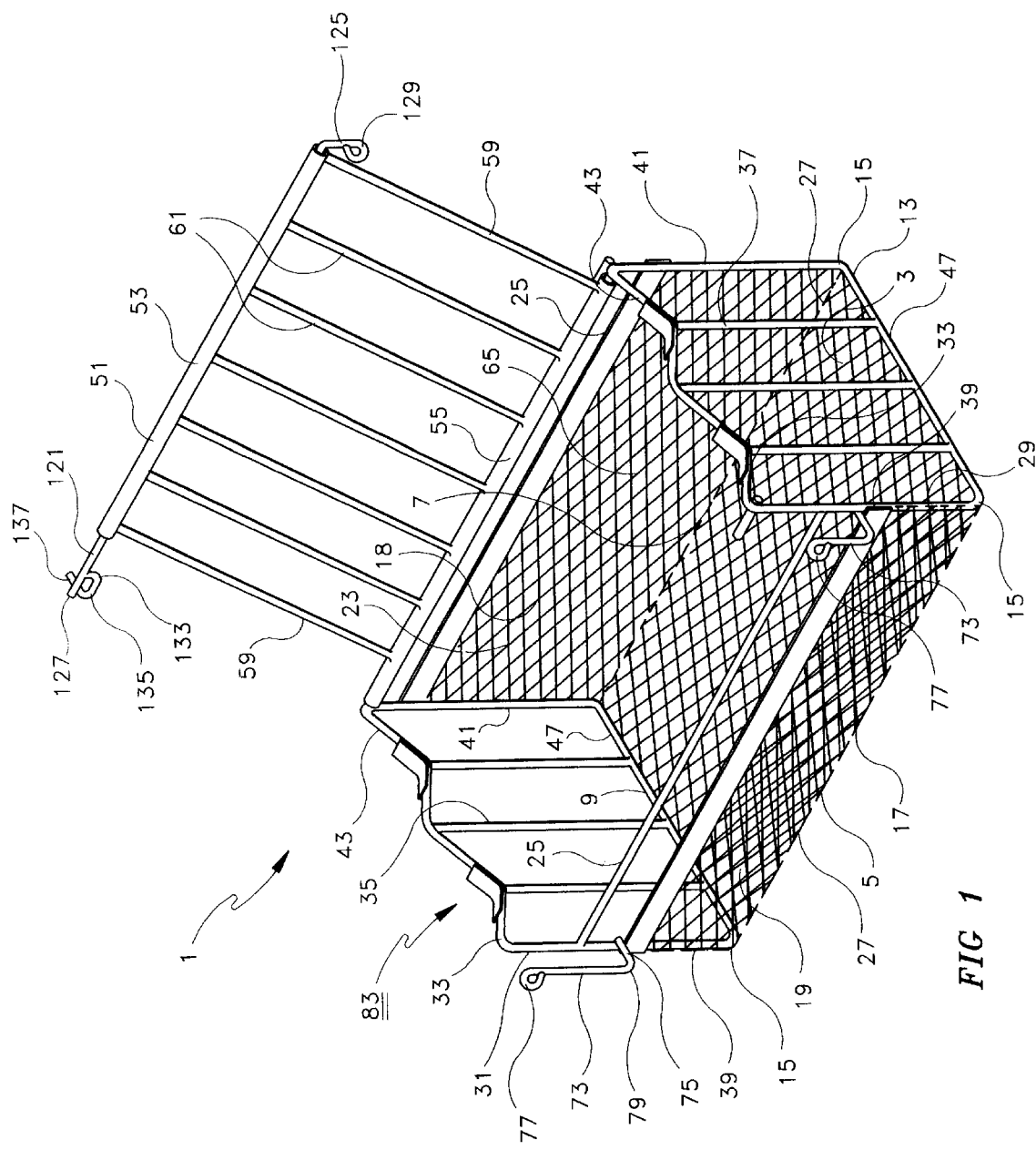
FIG. 1 is an isometric view of the container of this invention showing the lid panel opened to reveal the chamber interior thereof.

Turning now to the drawings wherein elements are identified by numerals and like elements are identified by like numerals throughout the seven figures, FIG. 1 shows the empty container 1 to include a bottom floor panel 3 defined by a pair of straight, elongated front and rear side edges 5 and 7 of terminal length held in spaced-apart arrangement by a pair of short, straight end edges 9 and 13 of terminal length, all said edges meeting at their respective intersecting distal ends to form corners 15 of generally rectangular-shaped perimeter 17. Floor panel 3 is preferably made up of wrought iron edges with a heavy gauge metal, planar screen 18 fixedly attached about the inside perimeter 17 such as by welding, bolting or the like. To secure container 1 by bottom floor panel 3 to the bed of the pickup truck, one can merely place a large washer under the head of a common lag bolt, drill a hole down through the bed of the pickup truck, insert the washered bolt down through the hole and secure it with a washer and nut from below. This may be done anywhere on bottom floor panel 3 and is not shown here for clarity and because it is part of the prior art method of fixing many panels to underlying planar structures.

A pair of flat vertical front and rear side wall panels 19 and 23 respectively are likewise provided in the form of elongated horizontal top and bottom edges 25 and 27 respectively of terminal length held in spaced-apart arrangement by a pair of shorter vertical end edges 29 and 31 of terminal length wherein said top and bottom edges and side edges meet at their respective distal ends to form the corners 33 of a generally rectangular perimeter having a heavy gauge screen, similar to screen 18 in floor panel 3, interior thereof. The screen in rear side wall panel 23 may likewise be attached to the side wall of a pickup truck bed by use of the bolt, washers and nut previously explained.

A pair of flat, vertical end panels 35 and 37 are provided in the form of elongated vertical side edges 39 and 41 of terminal length held in spaced-apart arrangement by a pair of horizontal shorter top and bottom edges 43 and 47 respectively of terminal length wherein said edges meet at their respective intersecting distal ends to form the corners of a generally rectangular perimeter. Side edges 39 and 41 are connected to vertical end edges 9 and 13 such as by welding along their entire length or spot welding therealong.

A top lid panel 51 is provided, defined by a straight front edge 53 and a straight rear edge 55, both of terminal length, held in spaced-apart arrangement by a pair of spaced-apart shorter straight end or side edges 59 of terminal length wherein said edges meet at their respective intersecting distal ends to form the corners of a generally rectangular perimeter preferably of the size and shape of bottom floor panel 3. Top lid panel front edge 53 and panel rear edge 55 are preferably stiff hollow tubes of terminal length and top panel rear edge (tube) 55 is pivotally attached over and about rear side wall panel top edge 25. Said lid panel 51 contains a plurality of stiff bars 61 arranged in parallel spaced-apart fashion attached between said hollow tubes 53 and 55 respectively so as to make top lid panel 51 pivotable about rear side wall panel top edge 25. When lid panel 51 is closed over side panels and said end panels, there is created a secure enclosure with a chamber 65 formed therein that is accessible through top lid panel 51. All of the elements making up container 1 are preferably made from wrought iron, or in the case of heavy-gauge metal screen, of mild steel.

Figure 2:
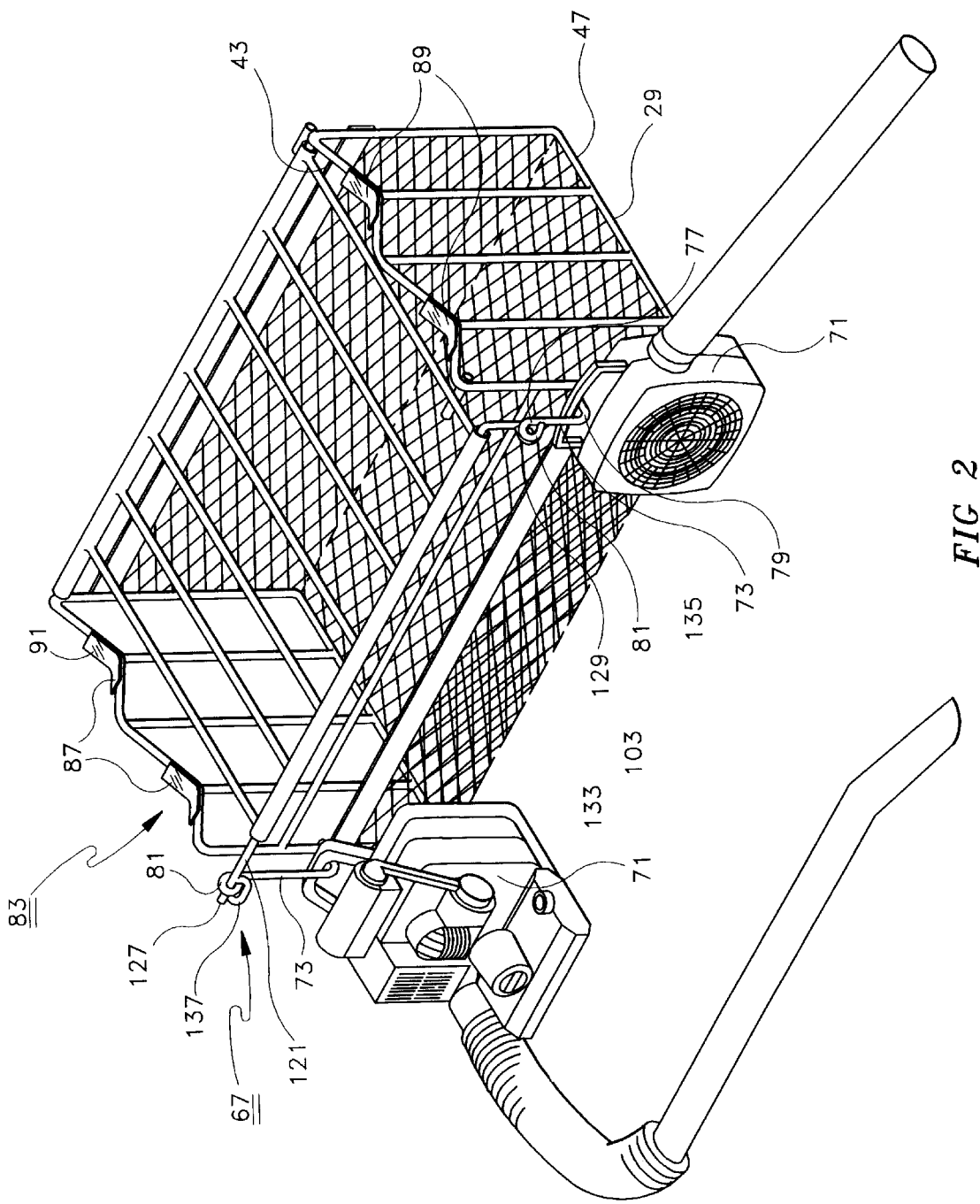
FIG. 2 is another isometric view of the container shown in FIG. 1 with the lid panel closed and showing the first means to hang leaf blowers, the second means to support storage of weed eaters, and the fourth means to lock the container while simultaneously lock the leaf blowers to the container.
Figure 5:
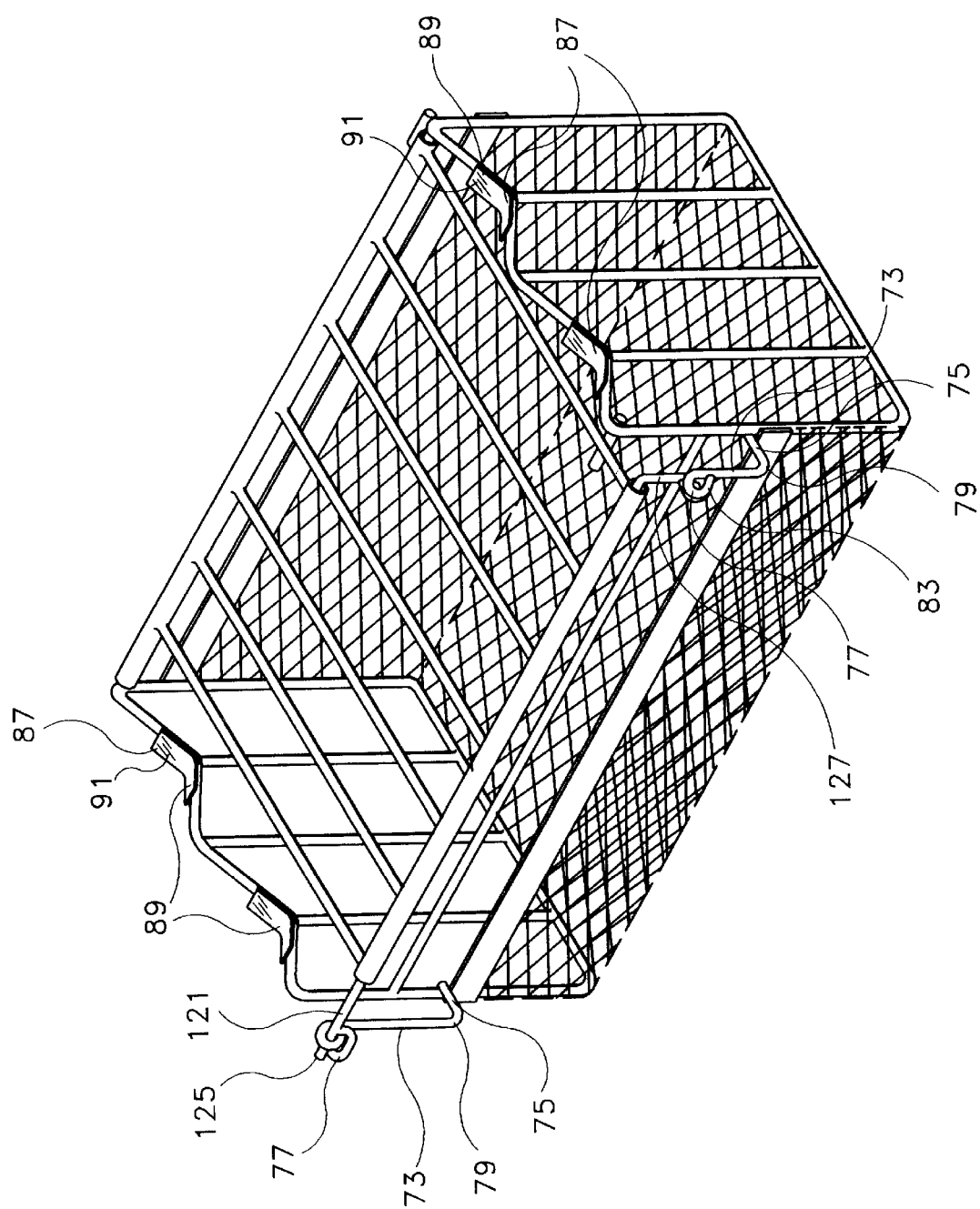
FIG. 5 is an isometric view of the embodiment shown in FIG. 2 with the leaf blowers removed.

As shown in FIGS. 1, 2 and 5, first means 67 is provided for hanging at least one, but preferably a pair, of leaf blowers 71 thereon and provides secure storage therefor. As shown in FIGS. 1 and 2, means 67 preferably comprises a pair of spaced-apart arms 73 of terminal length each defined by first and second distal ends 75 and 77 respectively where said first distal end 75 of each arm is attached, such as by welding, to front side wall panel vertical end edges 29 and 31 intermediate their distal ends and extended a short distance outward from container 1 before changing direction at a bend 79 and then proceeding upward, spaced-apart from and preferably parallel to vertical end edges 29 and 31 and terminate at a ring 81 formed on each second distal ends 77 at or near the top of side panels 19.

The leaf blowers 71 storable in this invention are of the commercial type that include a back-pack mounted gasoline engine that drives an air fan whose exhaust is confined to a short length of flexible ducting that is connected in series to a longer length of rigid tubing that is held in the hands of the operator and used to blow leaves. A carrying strap is mounted adjacent the gasoline engine and this strap is slipped over arm 73 in order to hang blowers 71 on container 1 as shown in FIG. 2.

Figure 3:
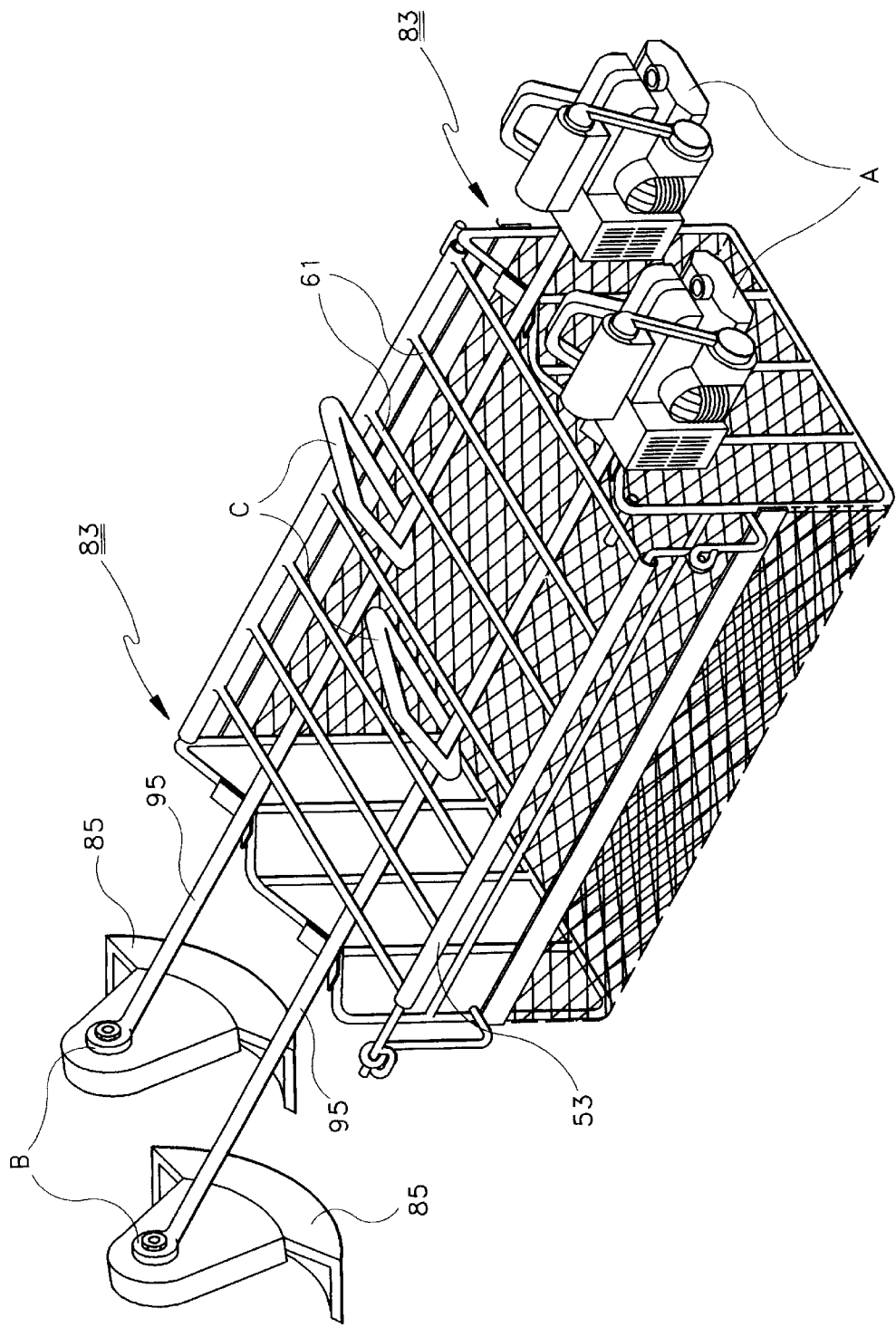
FIG. 3 is an isometric illustration of the embodiment shown in FIGS. 1 and 2 showing the preferred embodiment of the third means for storing hedge trimmers and chain saws inside the container and allowing their extended parts to extend outside the chamber.
Figure 4:
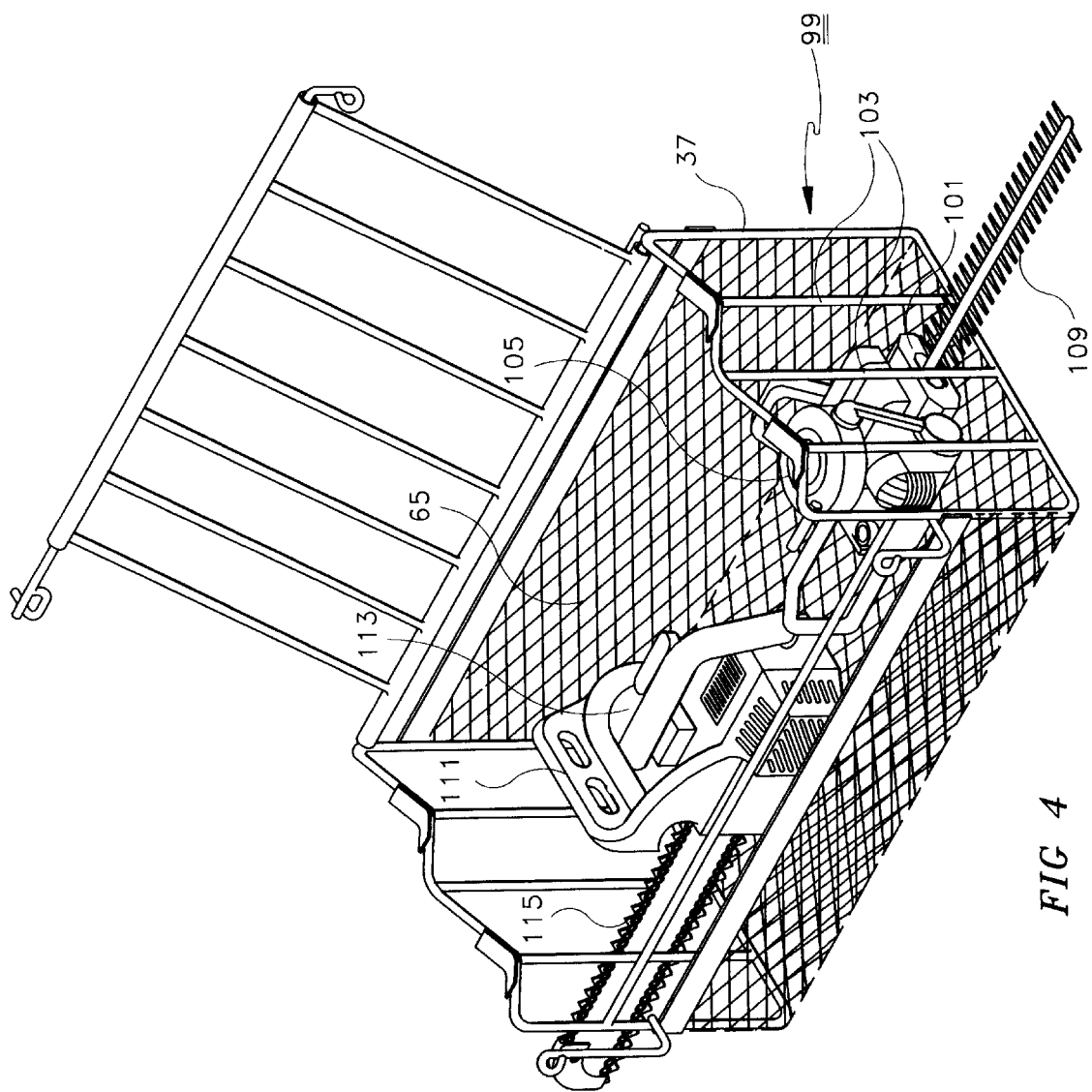
FIG. 4 is an isometric view of the embodiment shown in FIG. 2 showing the preferred embodiment of the second means for storing a pair of weed eaters in the interior thereof as well as the weed blowers themselves.

As shown in FIGS. 1,2 and 4, a second means 83 is provided on end wall panels 35 and 37 on which to support and secure a pair of weed eaters 85 (see FIG. 3). As shown in FIGS. 1 and 2, the preferred form of means 83 comprises two pairs 87 of double Y-shaped supports 89, each pair 87 placed in spaced-apart arrangement along container end wall panel top edge 43 and aligned and spanning transverse or cross-ways to container lid panel 51. Preferably, short lengths of plastic or rubber (elastomeric) foam tape 91 are glued on supports 89 to cushion weed eaters 85 to prevent denting or other damage thereto.

The weed eaters 85 storable in this invention are of the commercial type as shown in FIG. 3 that include an elongated tube 95 terminated at one (upper) end by a gasoline engine A that turns a rotating shaft (not shown) housed inside said tube 95 to spin a wire (also not shown) in rotation from a fitting B at the other end of tube 95 for cutting weeds. Weed eaters 85 are stored in container 1 by laying the elongated tubes cross-ways on Y-shaped supports 89 and closing top lid panel 51 down over said tubes to lock them securely therein while simultaneously supporting the entire weed eater on supports 89. As shown in FIGS. 1 and 2, the two pairs of Y-supports are set apart from each other to handle up to two weed eaters in one container.

In addition, the plurality of stiff iron bars 61 placed in spaced-apart horizontal arrangement in top lid panel 51, between straight front edge 53 and straight rear edge 55, is provided through which one or more handles C of the weed eater 85 may project, if necessary. However, for most uses, the handles C of weed eaters stored in Y-shaped supports 89 will be projected downward, into container interior 65.

As shown in FIG. 4, a third means 99 is formed in end wall panel 35 or 37 or both through which to accept the extension of a portion of a hedge trimmer 101 (see FIG. 4). As shown in FIG. 4, one form of means 99 is to place in panel 35 or 37 or both a plurality of stiff iron bars 103 in spaced-apart vertical arrangement therein and attach them to end wall panel top and bottom edges 43 and 47.

The hedge trimmers 101 storable in this invention are of the commercial type having an electric motor 105 at one end and pair of reciprocating toothed bars 109 extending outward therefrom. Third means 99 in the form of spaced-apart stiff vertical bars allows electric motor 105 and part of reciprocating toothed bars 109 to remain inside chamber 65 while any extension of bars 109 may pass outward through iron bars 103. Likewise, it is contemplated that one chain saw 111 may be stored in chamber 65 as shown in FIG. 4. The chain saws 111 that are storable in this invention are comprised of a gasoline-powered motor 113 and a moveable chain blade 115 extending therefrom. It is contemplated that small chain saw 111, having short chain blade 115, will be fully storable inside chamber 65. However, should the landscaper decide to use a larger chain saw having a longer chain blade, third means 99 is usable to extend the outer end of chain blade 115 therethrough and yet retain the motor and part of the chain blade inside chamber 65 in locked storage. While it may appear dangerous to allow a chain saw chain blade to extend outside a storage compartment, it should be remembered that the main purpose of the invention is to secure the tools in chamber 65 from theft and damage. The users of this invention are professionals and are generally very cautious in their handling of these powered tools. In addition, the chain saws will be, because of their weight, positioned at the bottom of chamber 65 so that the chain blades extending outside thereof will be lying adjacent the bed of the pickup truck.

As shown in FIGS. 1, 2 and 5, an iron rod 121 is preferably located inside top lid front panel edge tube 53 and capable of being twisted by hand. Rod 121 is defined by first and second terminal ends 125 and 127 respectively that lie outside the terminal ends of tube 53. As shown in FIG. 1, rod first terminal end 125 is formed into a ring 129, preferably of the same size and shape as ring 81 and bent parallel thereto so that when lid panel 51 is closed over container 1, rod 121 may be rotated by hand in tube 53 to swing ring 129 into adjacent juxtaposition with ring 81. These rings in adjacent juxtaposition provide a convenient place to slip there-through the hasp of a common padlock (not shown) for locking lid panel 51 on top of front panel 19 and simultaneously lock one leaf blower 71 against removal from arm 73.

To insure that the other leaf blower 71 is not removable from the other arm 73, on which it is hung, when lid panel 51 is in locked position and to aid in supporting iron rod 121, second terminal rod end 127 is extended to pass through ring 81 atop arm 73. As shown in FIG. 1, a short rod 133 is attached, such as by welding, to rod 121 adjacent end 127 and has a bend 135 formed therein and a terminal hook 137 extending from said bend 135 and arranged to contact arm 73.

Figure 6:
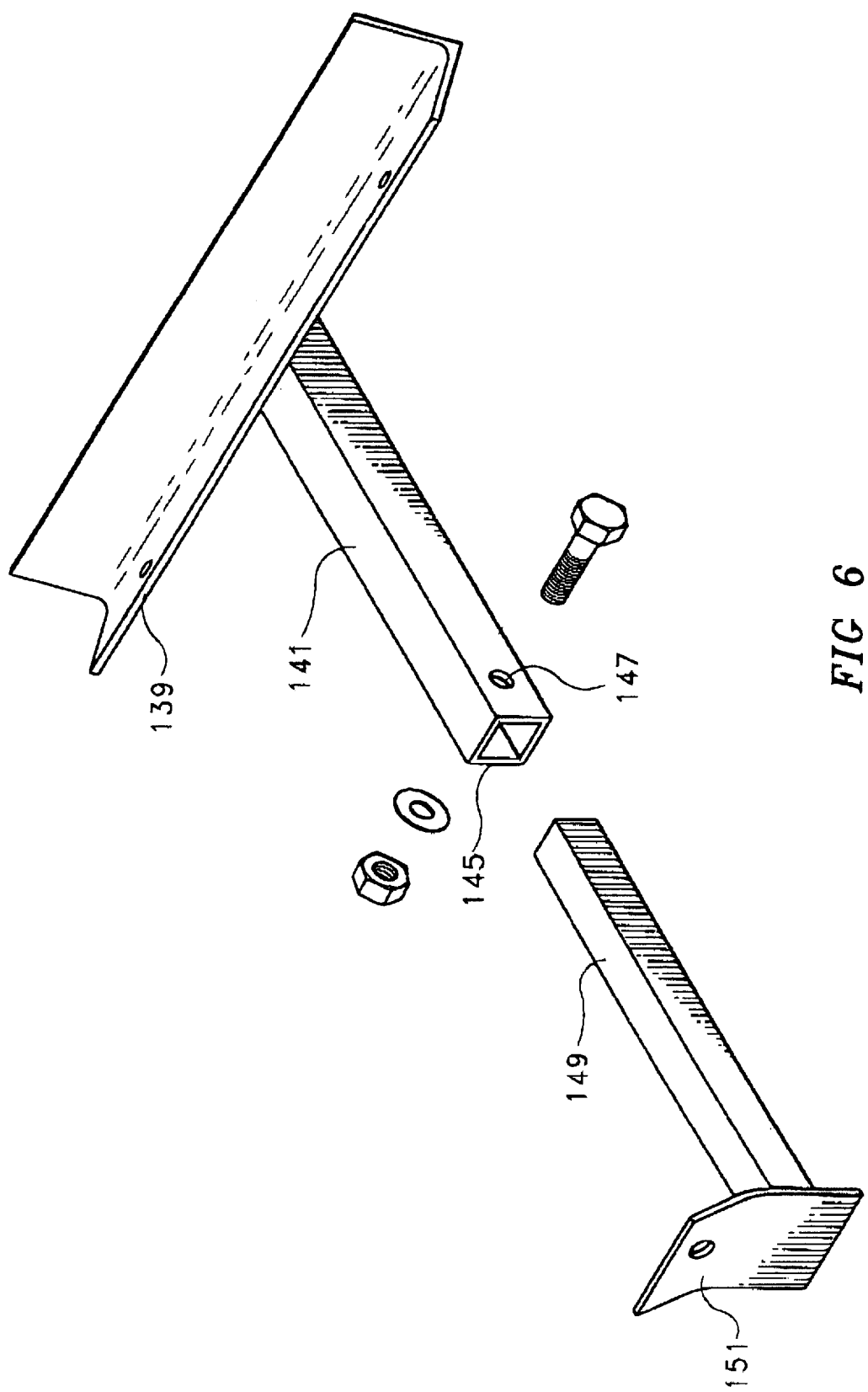
FIG. 6 is an isometric view of a unique support that is useful with this invention; and, FIG. 7 is an isometric view of the cage of this invention mounted in the bed of a typical pickup truck utilizing the support shown in FIG. 6.

As stated earlier, the cage of this invention can be conveniently mounted in the bed of virtually any truck. As shown in FIG. 6, a convenient aid in mounting the cages comprises a cradle arm 139 conveniently made from right angle steel stock where one portion of said arm fits underneath bottom floor front side edge 5 and the other, right angled portion fits in front of said side edge 5 thus both supporting the case from underneath and from one side. A first support arm 141 is fastened to the center of cradle arm 139, such as by was by welding, and takes the form of a hollow square cross-sectional pipe that extends outward to terminate at a distal end 145 that has associated therewith a cross-bore 147 of a size for receiving a bolt therethrough.

A second support arm 149 is arranged in axial alignment with the open distal end of first arm 141 and is of a size and shape to be conveniently slipped axially into said first arm 141 to produce an overall support arm of variable length. Second support arm 149 is preferably made of the same material as first arm 141. Second support arm 149 terminates at an attachment plate 151 that is curved to fit the contour of the fender well in the bed of the pickup truck. It also has an aperture formed therethrough for receiving a lock-down bolt as will now be explained.

Figure 7:
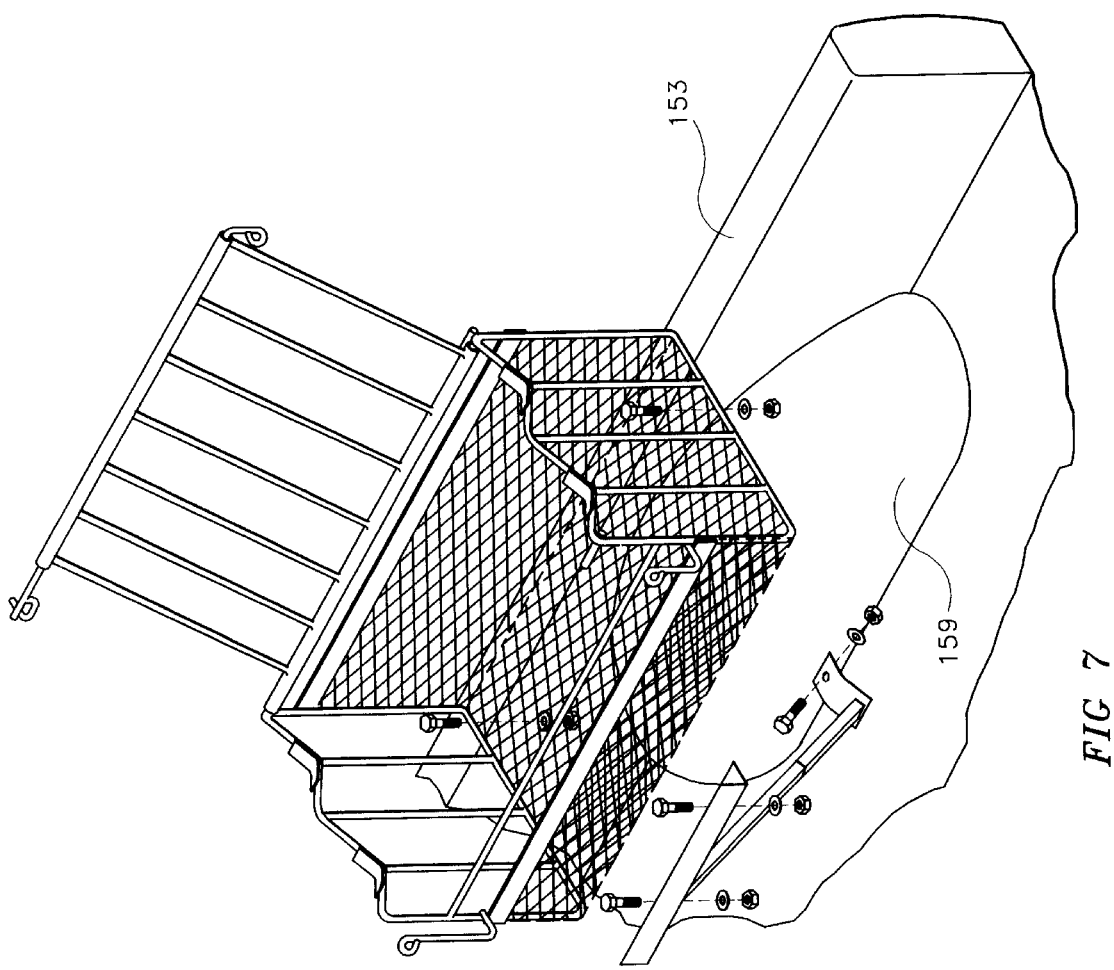

As shown in FIG. 7, one way to conveniently mount the cage of this invention is to place it upright so that rear side edge 7 of said cage rests on top of the side rail 153 of the truck bed as shown. One or more bolts with accompanying washers are passed downward through screen 18 and through holes drilled downward through side rail 153 so that the rear side of the cage is fastened and supported on truck bed side rail 153. Cradle are 139 is then placed as shown in FIG. 7 on the opposite side and bottom of the cage and attachment plate located against the portion 159 of the rear truck wheel fender that extends into the truck bed and is drilled and bolted in place. Second support arm 149 is slipped into the open distal end 145 of first support arm 141 and cross-bore 147 completed by drilling across the portion of second support arm 149 that is inserted in said first support arm 141 and bolting the arms together. Cradle arm 139 is then fastened to the bottom of the cage by common nut and bolt fasteners.

While the invention has been described with reference to a particular embodiment thereof, those skilled in the art will be able to make various modifications to the described embodiment of the invention without departing from the true spirit and scope thereof. It is intended that all combinations of members and steps which perform substantially the same function in substantially the way to achieve substantially the same result are within the scope of this invention.

What is claimed is:

1. An article of manufacture for storing and securing a variety of motor-driven landscape tools therein, comprising:
    a) a container including a bottom floor panel and upstanding spaced-apart front and rear side wall panels and end wall panels attached about the perimeter of said bottom floor panel and attached together along their respective marginal edges;
    b) a top lid panel pivotally attached to one of said vertical wall panels arranged to close over said container and form a secure enclosure having an interior chamber;
    c) a first means mounted exterior said container on which to hang at least one first tool;
    d) a second means formed on top of said end walls on which to support at least one second tool in secured confinement;
    e) a third means formed in one of said end walls through which to accept the extension of a portion of a third tool generally contained within said chamber; and,
    f) a fourth means mounted on said lid for interconnection with said first means for securing said lid over said container in locking engagement with said first means.

2. The article of claim 1 wherein said bottom floor panel is defined by a pair of straight, elongated front and rear side edges of terminal length held in spaced-apart arrangement by a pair of short, straight end edges of terminal length, all said edges meeting at their respective intersecting distal ends to form corners of a generally rectangular-shaped perimeter.

3. The article of claim 1 wherein said bottom floor panel includes a screen comprising a coarse mesh of wire through which a fastener may be passed for connecting said article to another structure.

4. The article of claim 1 wherein said front and rear side wall panels are planar and arranged vertically and comprise elongated horizontal top and bottom edges respectively of terminal length held in spaced-apart arrangement by a pair of shorter vertical end edges of terminal length wherein said top and bottom edges and side edges meet at their respective distal ends to form the corners of a generally rectangular perimeter having a heavy gauge screen interior thereof.

5. The article of claim 1 wherein said container is rectangular.

6. The article of claim 1 wherein said end wall panels comprise elongated horizontal top and bottom edges respectively of terminal length held in spaced-apart arrangement by a pair of shorter vertical end edges of terminal length wherein said top and bottom edges and side edges meet at their respective distal ends to form the corners of a generally rectangular perimeter.

7. The article of claim 1 wherein said top lid panel is defined by a straight front edge and a straight rear edge, both of terminal length, held in spaced-apart arrangement by a pair of spaced-apart shorter straight end edges of terminal length wherein said edges meet at their respective intersecting distal ends to form the corners of a generally rectangular perimeter of the size and shape of said bottom floor panel.

8. The article of claim 7 further including a plurality of bars set in spaced-apart arrangement for accepting therebetween the extended handle of at least one of the tools stored therein.

9. The article of claim 1 wherein said first means comprises a pair of spaced-apart arms of terminal length, each defined by first and second distal ends, respectively, where said first distal end of each arm is attached to said front panel vertical end edges intermediate their distal ends and extended a short distance outward from said container before changing direction at a bend and proceeding upward, spaced-apart from and parallel to said vertical end edges and there to terminate at said second distal ends at or near the top of said side panels.

10. The article of claim 1 wherein said second means comprises two pairs of double Y-shaped supports, each said pair placed in spaced-apart arrangement along said container end wall panel top edge and aligned and spanning transverse to said container lid panel.

11. The article of claim 10 further including short lengths of elastomeric foam tape are glued to said supports to cushion the weed eaters to prevent denting or other damage thereto.

12. The article of claim 1 wherein said third means includes a plurality of iron bars in spaced-apart vertical arrangement attached to said end panel top and bottom edges.

13. The article of claim 1 wherein said top lid front panel edge and said rear panel edge are hollow tubes of terminal length that are pivotally attached over and about said front and said rear side panel top edges and said fourth means includes an iron rod located inside said top lid front panel edge tube and is capable of being twisted by hand.

14. The article of claim 1 further including a support for enabling said cage to be mounted in the bed of a common pickup truck, wherein said support comprises:
    a) a cradle arm for supporting said cage along one side thereof;
    b) a first hollow support arm fastened to the center of said cradle arm and extending outward from said cage;
    c) a second support arm arranged in axial alignment with said first support arm of a size and shape to be conveniently axially interfitted with said first arm to produce an overall support arm of variable length; and,
    d) an attachment plate terminating said second support arm and curved to fit the contour of the fender well in the bed of the pickup truck so that said cage may be fastened along one side of its base to the upper rail of the bed of the pickup truck and fastened along the other side of its base to the fender well in the bed of the pickup truck.

15. An article of manufacture for storing and securing a variety of motor-driven landscape tools therein, comprising:

a) a container made of wrought iron including a bottom floor panel defined by a pair of straight, elongated front and rear side edges of terminal length held in spaced-apart arrangement by a pair of short, straight end edges of terminal length, all said edges meeting at their respective intersecting distal ends to form corners of a generally rectangular-shaped perimeter;

b) planar front and rear side wall panels extending vertically upward from the front and rear of said bottom floor panel perimeter and comprising elongated hollow metal tube horizontal top edges and bottom edges respectively of terminal length held in spaced-apart arrangement by a pair of shorter vertical end edges of terminal length wherein said top and bottom edges and side edges meet at their respective distal ends to form the corners of a generally rectangular perimeter having a heavy gauge screen interior thereof;

c) end wall panels attached about the perimeter of said bottom floor panel and attached together along their respective marginal edges wherein said end edges comprise elongated horizontal top and bottom edges respectively of terminal length held in spaced-apart arrangement by a pair of shorter vertical end edges of terminal length wherein said top and bottom edges and side edges meet at their respective distal ends to form the corners of a generally rectangular perimeter;

d) a top lid panel pivotally attached to one of said vertical wall panels arranged to close over said container and form a secure enclosure having an interior chamber;

e) a first means mounted exterior said container on which to hang at least one first tool;

f) a second means formed on top of said end walls on which to support at least one second tool in secured confinement;

g) a third means formed in one of said end walls through which to accept the extension of a portion of a third tool generally contained within said chamber; and, h) a fourth means mounted on said lid for interconnection with said first means for securing said lid over said container in locking engagement with said first means.

16. The article of claim 15 wherein said top lid panel is defined by a straight front edge and a straight rear edge, both of terminal length, held in spaced-apart arrangement by a pair of spaced-apart shorter straight end edges of terminal length wherein said edges meet at their respective intersecting distal ends to form the corners of a generally rectangular perimeter of the size and shape of said bottom floor panel.

17. The article of claim 16 further including a plurality of stiff bars set in spaced-apart arrangement for accepting therebetween the extended handle of at least one of the tools stored therein.

18. The article of claim 15 wherein said first means comprises a pair of spaced-apart arms of terminal length, each defined by first and second distal ends, respectively, where said first distal end of each arm is attached to said front panel vertical end edges intermediate their distal ends and extended a short distance outward from said container before changing direction at a bend and proceeding upward, spaced-apart from and parallel to said vertical end edges and there to terminate at rings formed on each said second distal ends at or near the top of said side panels.

19. The article of claim 15 wherein said second means comprises two pairs of double Y-shaped supports, each said pair placed in spaced-apart arrangement along said container end wall panel top edge and aligned and spanning transverse to said container lid panel.

20. The article of claim 19 further including short lengths of elastomeric foam tape are glued to said supports to cushion the weed eaters to prevent denting or other damage thereto.

21. The article of claim 15 wherein said third means includes a plurality of stiff iron bars in spaced-apart vertical arrangement attached to said end panel top and bottom edges.

22. The article of claim 15 further including a support for enabling said cage to be mounted in the bed of a common pickup truck, wherein said support comprises:

a) a cradle arm for supporting said cage along one side thereof;

b) a first hollow support arm fastened to the center of said cradle arm and extending outward from said cage;

c) a second support arm arranged in axial alignment with said first support arm of a size and shape to be conveniently axially interfitted with said first arm to produce an overall support arm of variable length; and, d) an attachment plate terminating said second support arm and curved to fit the contour of the fender well in the bed of the pickup truck so that said cage may be fastened along one side of its base to the upper rail of the bed of the pickup truck and fastened along the other side of its base to the fender well in the bed of the pickup truck.

* * * * *